March 4, 1941.   G. F. MAUGHMER   2,233,923
CONTROL-DEVICE
Filed Sept. 26, 1939

Inventor:
Glenn F. Maughmer,
by Harry E. Dunham
His Attorney.

Patented Mar. 4, 1941

2,233,923

UNITED STATES PATENT OFFICE 2,233,923

CONTROL DEVICE

Glenn F. Maughmer, Phoenix, Ariz., assignor to General Electric Company, a corporation of New York Application September 26, 1939, Serial No. 296,601

3 Claims. (Cl. 177—311)

My invention relates to control devices, more particularly to float operated control devices and has for its object means responsive to a failure of the float operating means for giving a suitable signal indicating the condition of failure.

My invention has a special application to float-operated electric switches such as used in the control of motors driving pumps and more especially to such devices which are provided with a substantially horizontal operating member, this member being turned by a float in response to the liquid level. For example, the operating shaft may be provided with a sprocket wheel over which runs a chain having a weight on one end and a float on the other end.

It has been found that the float operating means, especially the chain is subject to failure, particularly in those applications where the chain is exposed to corrosive gases or liquids. In accordance with my invention, I provide means pivotally mounting the switching mechanism in such manner that it is overbalanced about a pivotal support against the weight and float and normally is held by the weight and float in a predetermined position about this pivot. I also provide signal means such as a switch which is operated by movement of the switch about its pivot in the event of breakage of the chain to give a suitable signal indicative of this condition.

Figure 1:
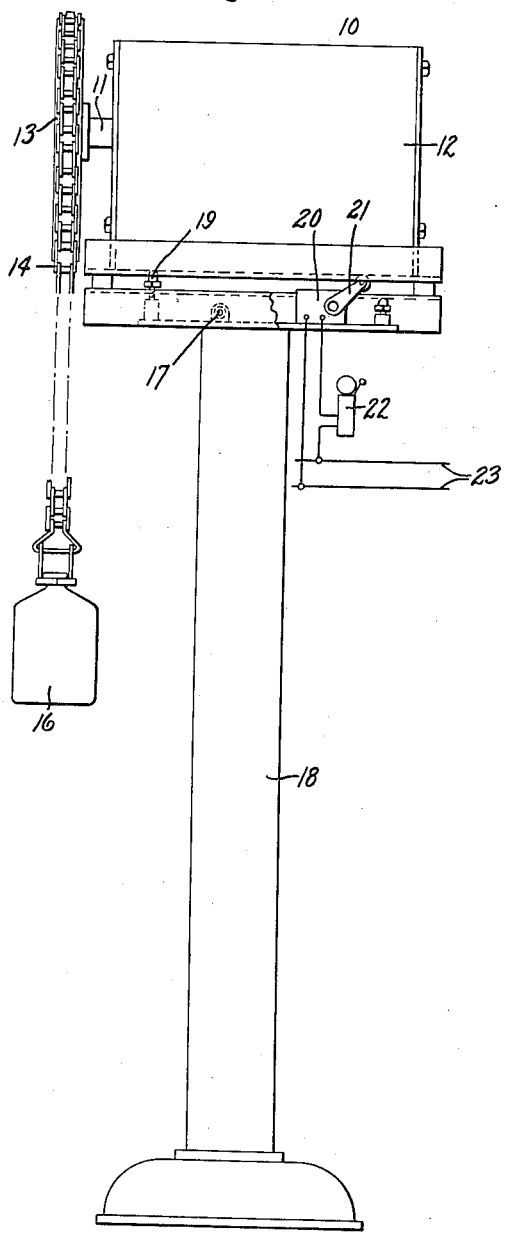
Figure 2:
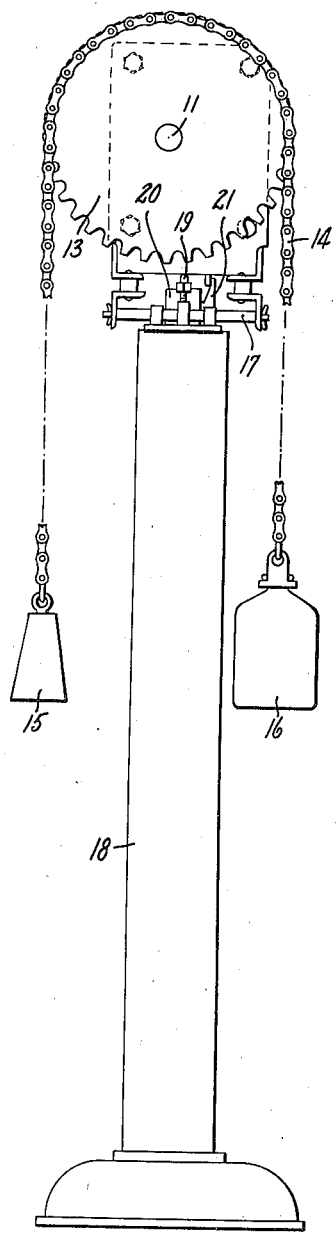

For a more complete understanding of my invention, reference should be had to the accompanying drawing, Fig. 1 of which is an elevation view of a float operated switch provided with my invention while Fig. 2 is a side elevation view of the device shown in Fig. 1.

Referring to the drawing, I have shown my invention in one form as applied to a float operated switch 10 which is provided with an operating shaft 11 normally substantially horizontal. As shown, the shaft 11 extends into an enclosing casing 12 where it is provided with suitable operating means such as cams movable to open and close control switches, for example as described in Patent No. 1,787,292, issued to George R. Townsend on December 30, 1930. On the outer end of the shaft 11 is a sprocket wheel 13 over which extends an operating chain 14 having on one end a weight 15 and on the other end a suitable float 16. It will be understood that the float 16 is actually heavier than the weight 15 although the weight 15 is heavy enough when the float 16 is supported by the liquid to operate the switching device in a counter-clockwise direction as viewed in Fig. 2. When the liquid level drops, the float 16 however turns the sprocket wheel in a clockwise direction as viewed in Fig. 2.

In a typical application of such control means, the switch 10 is arranged to control the starting, stopping and possibly also the speed of operation of one or more motors driving a suitable liquid pump (not shown), the float 16 being responsive to the level of the liquid being pumped. When the liquid level falls to a predetermined minimum, the switch 10 is operated by the float 16, for example, to stop the motor and pump and when the liquid level rises to a predetermined maximum, the switch 10 is operated by the weight 15 and float 16 to energize and start the motor.

In carrying out my invention, I mount the switching device 10 on a pivot 17 carried on the top of a suitable supporting pedestal 18. This pivot is positioned horizontally on the left-hand side as viewed in Fig. 1 of the center of gravity of the switching device 10 not including the weight of the weight 15 and the float 16. Thus the switching device 10 normally is overbalanced about the pivot pin 17 in a clockwise direction as seen in Fig. 1 but it is normally held against its overbalanced weight by the weight of the weight 15 and the float 16 in the position shown in Fig. 1. A suitable stop 19 is provided on which the switching device 10 comes to rest.

Also mounted on the pedestal 18 is a control switch 20 of suitable construction having an operating arm 21, the free end of which extends upward substantially into engagement with the lower side of the switching device 10. This control switch 20 is in the circuit of a suitable signal device such as a bell 22 energized from a suitable source of electrical supply 23. In the position of the arm 21 shown, the switch 20 is open and consequently the signal device 22 is not energized.

In the event, however, that the chain 14 breaks or the weight or float become disengaged therefrom so that the control device 10 moves about its pivot in a clockwise direction, as seen in Fig. 1, the arm 21 is depressed, the switch 20 thereby closed, and the signalling device 22 caused to operate whereby a signal is given of this defective condition of the operating mechanism. Obviously various other signals may be used. For example, the switch 20 may be arranged to control the operating circuit of the pump motor controlled by the switching device 10 so as to deenergize the motor when the switch 20 is operated. In such case, the signal is the deenergization and stopping of the driving motor.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. The combination with a control device, of a wheel for operating said control device, a weight, a float, a flexible member passing over said wheel connecting said weight and float to each other and to said control device so that said weight and float are supported by said control device and said control device is operated in response to the movement of said float, means mounting said control device for movement in a predetermined direction and so that said control device is normally held by said weight and float in a predetermined position, said control device being biased against said weight and float to another position in the event of failure of said flexible member, and control means actuated by said control device in moving to said other position.

2. The combination with a control device provided with a rotary operating element, of a wheel for operating said control device, a flexible member passing over said wheel, a weight and float connected to said flexible member on opposite sides of said wheel cooperating to rotate said element, means mounting said control device on a pivot so that said control device is overbalanced against said weight and float but normally held by said weight and float in a predetermined position about said pivot, said control device moving about said pivot to a second predetermined position in the event of failure of said operating means, and control means actuated by said control device in moving to said second predetermined position.

3. The combination with a switch provided with a rotary operating element, of a sprocket wheel secured to said operating element, a chain passing over said sprocket wheel, a weight and float on the ends of said chain respectively for rotating said element, means mounting said switch on a pivot so that said switch is overbalanced against said weight and float but normally held by said weight and float in a predetermined position about said pivot, said switch being free to move about said pivot to a second predetermined position in the event of failure of said chain, and signal means actuated by said switch in moving to said second predetermined position.

GLENN F. MAUGHMER.